HUNTER & GARDNER.
Plow.
No. 9,362.
Patented Oct 26, 1852.
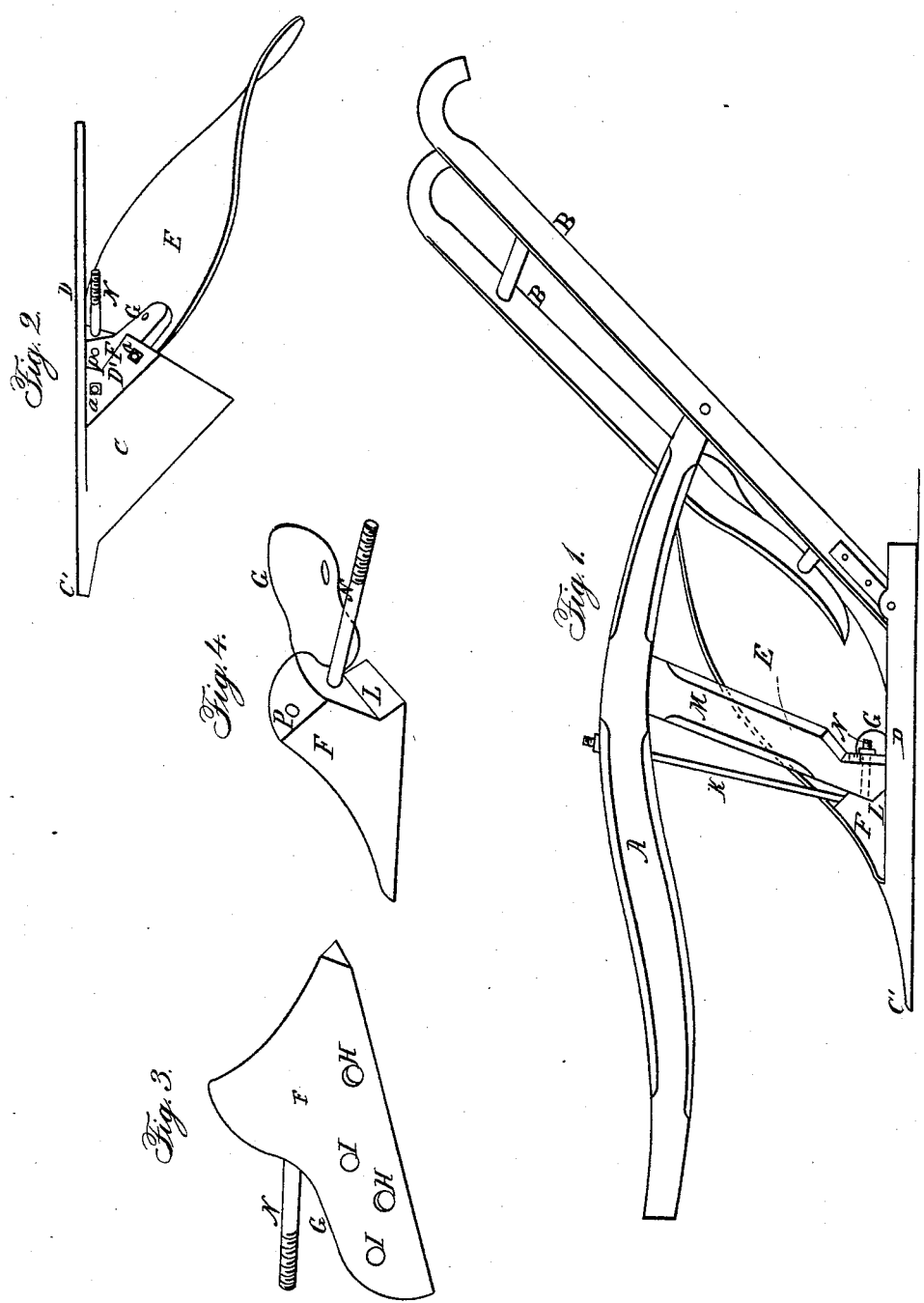

UNITED STATES PATENT OFFICE.

WM. L. HUNTER AND ALBERT GARDNER, OF CINCINNATI, OHIO; SAID GARDNER ADMINISTRATOR OF SAID HUNTER.

IMPROVEMENT IN CONSTRUCTING PLOWS.

Specification forming part of Letters Patent No. 9,362, dated October 26, 1852.

*To all whom it may concern:*

Be it known that WM. L. HUNTER and ALBERT GARDNER, of Cincinnati, in the county of Hamilton and State of Ohio, invented certain new and useful Improvements in Plows; and I do hereby declare that the same are described and represented in the following specification and accompanying drawings.

It has been the practice of plow-makers for a long series of years to make plows almost entirely of cast-iron, and they have been considered a great improvement over the old wooden plows which preceded them, and in soils that are loose, or which contain sufficient gravel, sand, or other gritty matter to make it polish the plow as it slides through it, they work very well; but it is well-known that there are some soils which are so adhesive and of such a nature as to adhere to a cast-iron plow even if it is well polished, as cast-iron is not susceptible of being polished so as to slip freely in such soils. In some of these soils a wrought-iron plow well polished works very well, as it takes a finer polish than cast-iron. Then there are some soils on the prairies and on the bottom lands along the Mississippi River and its tributaries which are so adhesive in their nature and so entirely destitute of any gritty matter as to adhere to a wrought-iron plow, and in which such a plow will not slip freely. Hence a plow made of steel, which takes a finer polish than wrought-iron, is required for such soils, and is found by experience to work admirably, and to perform the service much more efficiently than any other with one-half or two-thirds of the labor of the team and plowman that is required when any other plow is used. Besides, it does the work a great deal better, leaving the ground in so much better order as to render the after cultivation much less laborious than when any other plow is used.

It is usual in making cast-iron plows to cast the landside in one piece, the mold-board in another, and the share and point in the third, although they are sometimes cast whole, and sometimes the point and share in separate pieces, and when cast in this way it is usual to cast such protuberances, projections, and recesses on and in each as are desirable to fasten the whole together with facility, so as to make a good and durable plow; and previous to the date of our invention some of the wrought-iron and steel plows were made by welding the landside, share, point, and mold-board together, with much labor and consequent expense, and when the point or share wore off or dull they were extremely difficult to sharpen; and sometimes the landside, share, and point were made in one piece and the mold-board in another, and the share extended up under the mold-board, which was bolted to it, and the standard which connects them to the beam was fastened to some one of them in some manner which suited the notion of the maker. When the plows were made in this way the connection between the share and mold-board, although apparently strong and firm, soon became loose and shackling and so defective as to render the plow useless before the other parts were half worn out. And, further, some plows were made by butting the edges of the share and mold-board together and fastening strips of iron to both underneath across the joint. This also proved defective, as the strips of iron which connected the parts generally get bent soon after applying the plow to use, and open the joint between the share and mold-board, and throw them out of a proper position in regard to each other, so as to cause delay and expense in repairing. Hence this plow proved as defective as those before mentioned, and was soon abandoned.

To remedy the defects of all the plans of making plows above described, we were induced to construct a block to which we fit and fasten the bolt to the beam, if one is used, also the standard, mold-board, landside, share, and point, whether the three latter were made in one piece or otherwise, in such a way as to make a plow with wrought-iron or steel mold-board, share, point, and landside, which would be more durable and cheaper than those heretofore mentioned. Besides, when the point or share wears dull they can be removed with facility and sharpened, and replaced without taking the plow nearly or quite all to pieces, as would be necessary in those heretofore described; or the dull parts may be removed and sharp ones put in their place by the plowman with very little delay or inconvenience, and the steel plows made with our improvements have been proved to be as much superior to the cast or wrought iron plows as they were to the old wooden ones which preceded them.

To enable others skilled in the art to make and use our invention, we will proceed to describe its construction, referring to the before-mentioned drawings, in which the same letters indicate like parts in all the figures.

Figure 1 is an elevation of our plow as improved. Fig. 2 is a representation of the bottom of the landside, share, mold-board, and block fastened together. Fig. 3 is a perspective view of the concave side of the block which is fitted to the mold-board, and Fig. 4 a perspective view of the opposite side of said block.

The beam A and handles B B may be constructed in the usual form or otherwise, and the two latter may be fastened to the mold-board and landside in some convenient mode.

The share C, point C', and landside D are all made in one piece, as represented in the drawings. The upper and hinder part of the share D' is bent so as to lie in a plane parallel to the lower edge of the share and landside. Upon this portion of the share we place the back F, made in the form represented in Figs. 3 and 4, the mold-board E having been previously riveted to the concave side of the block through the holes I I, and some holes made in the mold-board and countersunk to correspond with the holes H H in the block, and some holes made in the portion D' of the share to correspond with the holes H H in the block, which is now placed upon the share and firmly fastened by the bolts $a\ a$.

The rod N is fastened into the block in the position represented by casting the block around it or otherwise, and a screw cut upon it so as to secure the standard, which is fitted to the block, as represented, the lower end being beveled to fit the projection L upon the block, which aids materially in supporting and holding the standard M in its proper position.

The rod or bolt K is made with a head at the lower end, passed through the hole P in the block and up through the beam, and fastened by a nut upon the top, which completes the plow ready for use, except the clevis.

We contemplate that the portion D' of the share may be shaped so as to under or over lie that portion of the mold-board upon the block, if preferred; but we think it best to make them as above described. Also, that the share, point, and landside may be made in separate pieces and fastened to the block, or a part of them fastened to the block and the others to these, as may suit the fancy or convenience of the maker.

What I claim as the invention of the aforesaid WM. L. HUNTER and myself in the construction of the above-described plow is—

Bolting the standard, mold-board, landside, and share to the block F, or its equivalent, instead of bolting or fastening the parts to each other, as has been practiced heretofore, which block F may be connected to the beam by a bolt, K, or otherwise, substantially as described and represented.

In testimony whereof I have hereunto signed my name, for myself and as administrator of WM. L. HUNTER, deceased, before two subscribing witnesses.

ALBERT GARDNER.

Witnesses:
LEVI PITMAN,
J. DENNIS, Jr.